United States Patent [19]

Louthan

[11] 4,456,203
[45] Jun. 26, 1984

[54] AIRCRAFT PROPULSION SYSTEM HAVING A TRANSLATABLE, DIRECTIONABLE EXHAUST NOZZLE

[75] Inventor: John D. Louthan, Dallas, Tex.

[73] Assignee: LTV Aerospace and Defense Company, Dallas, Tex.

[21] Appl. No.: 403,957

[22] Filed: Aug. 2, 1982

[51] Int. Cl.³ .................... B64C 15/02; B64D 30/04
[52] U.S. Cl. .................................. 244/23 D; 244/52; 244/12.5; 60/230; 239/265.19
[58] Field of Search .................. 244/12.1, 12.3, 12.5, 244/12.4, 23 R, 23 A, 23 B, 23 D, 52, 216, 110 B; 239/265.35, 265.19, 265.33, 265.13; 60/230

[56] References Cited

U.S. PATENT DOCUMENTS

| | | | |
|---|---|---|---|
| 2,791,089 | 5/1957 | Dimmock | 239/265.35 |
| 2,918,231 | 12/1959 | Lippisch | 244/23 B |
| 2,951,660 | 9/1960 | Gilberty | 239/265.33 |
| 3,117,545 | 1/1964 | Warner | 244/23 R |
| 3,258,206 | 6/1966 | Simmonson | 244/12.5 |
| 3,330,500 | 7/1967 | Winborn | 244/12.5 |
| 3,532,306 | 10/1970 | Meier | 244/12.3 |
| 3,568,793 | 3/1971 | Millman | 239/265.19 |
| 3,801,048 | 4/1974 | Riccius | 244/23 B |
| 4,175,385 | 11/1979 | Nash | 244/12.5 |
| 4,365,774 | 12/1982 | Coronel | 244/216 |

FOREIGN PATENT DOCUMENTS

| | | | |
|---|---|---|---|
| 1281948 | 12/1961 | France | 244/12.5 |
| 951373 | 3/1964 | United Kingdom | 244/23 R |

Primary Examiner—Galen L. Barefoot
Attorney, Agent, or Firm—James M. Cate; Stephen S. Sadacca; Thomas F. Daley

[57] ABSTRACT

An aircraft propulsion system is disclosed having an exhaust nozzle structure having an exhaust deflection structure extending within an exhaust duct to direction exhaust flow along selected flow paths. In its preferred embodiment, the exhaust deflection structure is a variable geometry deflection structure having a distal end portion which is movable, relative to adjacent aircraft structure, within an exhaust duct whereby the exhaust deflection structure is positionable as an extension of an upper, aft wall portion of the exhaust duct. In the preferred embodiment, the exhaust nozzle structure includes a guide structure or nozzle segment, connected to the exhaust deflection structure, which is translatably mounted to adjacent aircraft structure for permitting fore and aft movement of the nozzle segment along the aircraft structure.

25 Claims, 12 Drawing Figures

AIRCRAFT PROPULSION SYSTEM HAVING A TRANSLATABLE, DIRECTIONABLE EXHAUST NOZZLE

TECHNICAL FIELD

This invention relates to aircraft propulsion systems and, more particularly, to aircraft propulsion systems for vertical and short take-off and landing aircraft.

BACKGROUND ART

Designers of vertical and short take-off and landing aircraft (V/STOL aircraft) have proposed a variety of structures for controlling the direction of engine exhaust flow during the translation from vertical to conventional horizontal flight. Certain of these systems have in fact become operational, but in general they have suffered inefficiencies in terms of fuel consumption and effective thrust. Additionally, the mechanisms employed, such as variable geometry exhaust ducts and actuating mechanisms, have been undesirably complex. As will be understood by those in the art, substantial thrust forces are required in V/STOL propulsion systems since, during take-off and substantially vertical flight modes, the total downwardly directioned thrust forces must equal, and at times exceed, the total weight of the aircraft. Accordingly, the exhaust ducts sustain substantial loads when directioning or "vectoring" the exhaust gases. Because of this requirement for substantial structural strength and because of the complexity of construction of articulated exhaust duct structures and the corresponding actuating and control systems, many of the prior-art propulsion systems have themselves introduced an undesirable degree of additional weight, along with substantial complexity and costs.

One such prior-art system, disclosed in U.S. Pat. No. 2,951,660, employs a variable geometry exhaust deflector structure which extends rearwardly from the aft exhaust duct of a jet engine housing. A series of articulated segments are provided, supported by a serie of linkages connected to the aircraft structure and to each of the segments. The series of segments is translated from a horizontal orientation (in which the segments are aligned horizontally and extend rearwardly from the engine exhaust nozzle) and a downwardly deflected and curved orientation. When the deflector structure extends downwardly, the engine exhaust impinges against the segments and is deflected downwardly for providing increased lift. It will be understood by those in the art that the loads sustained by such linkage elements and articulated segments are cumulative, or additive; that is, those linkage elements and ramp segments nearest the aircraft structure must sustain not only the forces exerted by the engine exhaust impinging against them, but also those forces exerted against the remaining, aft segments. Thus, the linkages, duct segments, and actuators must be of substantial structural stength to sustain the operational loads. It will also be understood that, during operation over extended periods of time, substantial vibrational and environmental loads will be sustained by the various movable elements.

VSTOL power plants have also employed various other complex actuating and supporting structures for directioning exhaust flow. The system disclosed in U.S. Pat. No. 3,700,189, for example, includes at least two propulsive fan units each including a respective engine, the fan units being pivoted, within engine pods, between horizontal and vertical orientations for providing horizontal and vertical thrust. Other aircraft have employed multiple exhaust nozzles which project from side portions of the aircraft fuselage and which are pivoted between horizontal and substantially vertical orientations.

It is highly desirable in such VSTOL Propulsion Systems that the downwardly directioned exhaust flow be distributed so that the net upward reactive force is substantially in coincidence with the center of mass of the aircraft. To accomplish this, many of the prior-art systems employ two, three, or four exhaust nozzles positioned laterally around the center of mass and arranged for providing net downward thrust at the center of mass. As an example, one military attack aircraft employs pairs of exhaust nozzles which project to the left and the right of the fuselage, the nozzles having swivel joints which permit pivotal rotation of the respective exhaust nozzles about generally horizontal axes, whereby the nozzles are pivoted from a horizontal orientation to a downwardly projecting orientation. The use of such multiple, laterally arranged exhaust nozzles, to provide net lift forces coincide with the center of mass, results in increased drag and weight, and multiple actuation and control mechanisms are necessary for positioning the several nozzle structures. In summary, prior-art systems have in general suffered from a number of structural and operational limitations.

It is, accordingly, a major object of the present invention to provide a new and improved propulsion system adapted for use in V/STOL Aircraft.

Another major object is to provide a propulsion system which is adapted for deflecting or vectoring thrust of aircraft in flight (including conventional aircraft not having vertical flight characteristics) for enhancing the performance and maneuvering capabilities of the aircraft.

Another object is to provide such a propulsion system having apparatus for directioning exhaust gases generated by a jet propulsion engine, which system is of simplified, rugged construction, having relatively few moving elements.

A further object is to provide such a propulsion system having a variable geometry exhaust deflection structure which does not entail the use of a multi-element linkage structure for supporting and positioning the structure.

Yet another object is to provide such a system which is adapted for integral construction in a jet engine housing and in which the variable geometry exhaust deflection system is of aerodynamically efficient configuration.

Still another object is to provide such a system which requires only one exhaust duct structure.

Another object is to provide such a structure which is of practicable construction, adapted for reliable operation under severe environmental and operational conditions.

Other objects and advantages will be apparent from the specification and claims and from the accompanying drawing of a preferred embodiment of the invention. While a preferred embodiment, along with modifications thereof, is described and illustrated in detail herein by way of example, it should be understood that various other embodiments and applications of the system may be made without departing from the scope of the invention, as defined in the accompanying claims.

Figure 7:
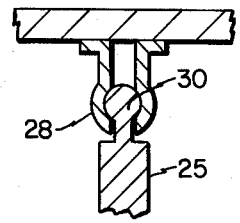
Figure 4:
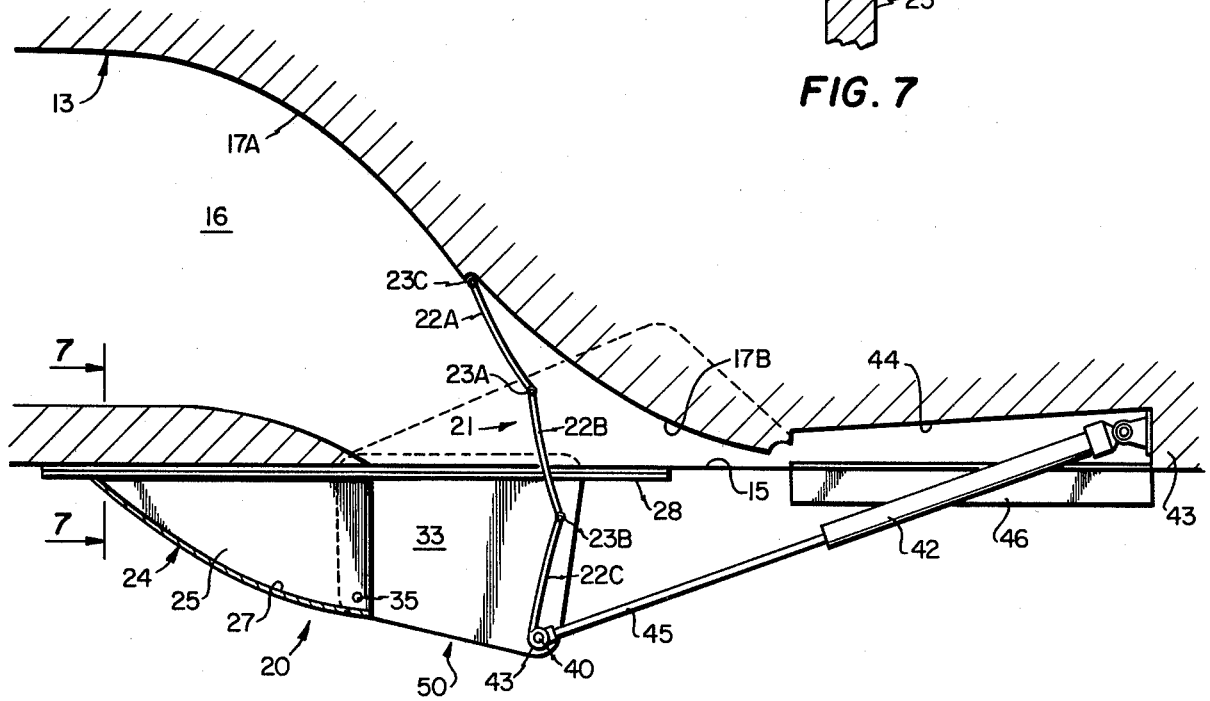
FIG. 4 is a view, similar to FIG. 3, showing the exhaust duct structure positioned in its forward position.
Figure 5:
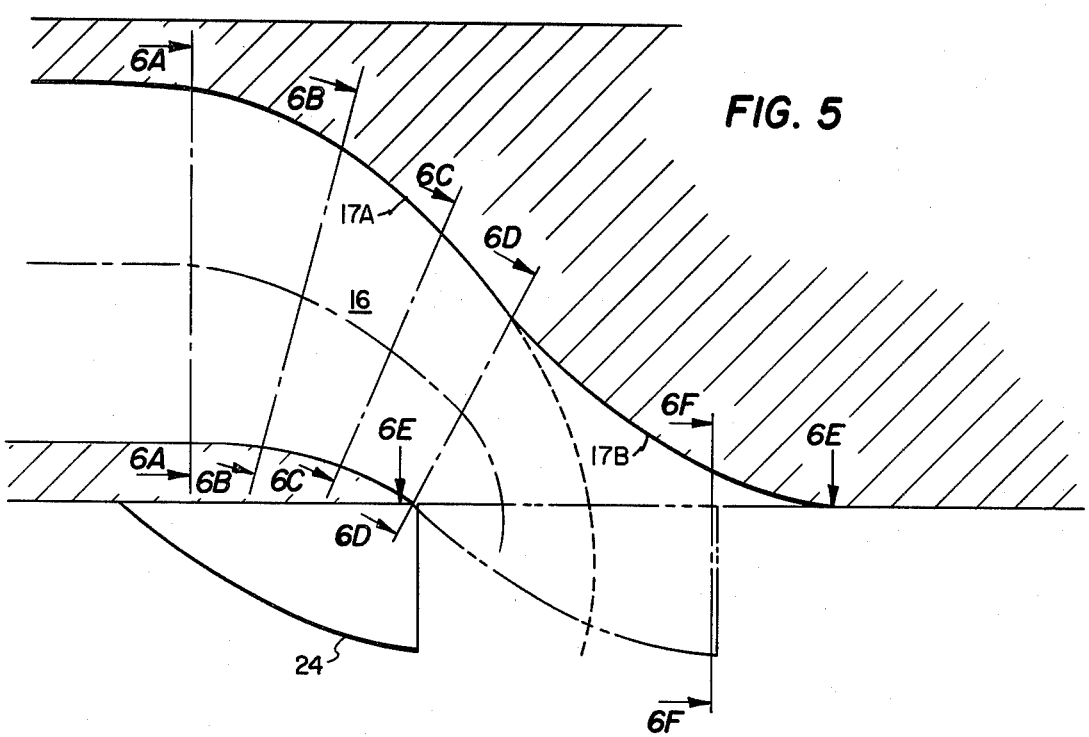
FIG. 5 is a diagrammatic representation, taken as on a longitudinal section, of the aft, exhaust duct portion of the engine passageway.

FIGS. 6A, 6B, 6C, 6D, 6E, and 6F are representations of the cross-sectional configuration of the engine duct passageway, taken as on lines 6A—6A, 6B—6B, 6C—6C, 6D—6D, 6E—6E, and 6F—6F, respectively, of FIG. 5; and FIG. 7 is a fragmentary, cross-sectional view of the track, the supporting structure, and one of the nozzle segment sidewalls, taken as on line 7—7 of FIG. 4.

DISCLOSURE OF THE INVENTION

Figure 1:
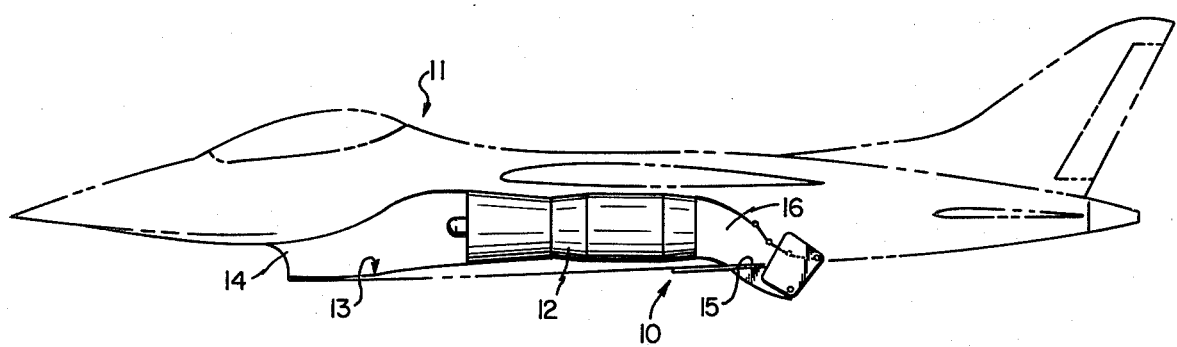
FIG. 1 is a diagrammatic representation of the preferred embodiment of the VSTOL propulsion system of the present invention, showing in broken lines a side view of a single-engine aircraft employing the propulsion system.

With reference to FIG. 1, the preferred embodiment of the V/STOL propulsion system 10 is shown, by way of illustration, employed in a single-engine, attack-/fighter aircraft 11. A turbofan or turbojet engine 12 is mounted within a passageway 13 extending longitudinally along the lower portion of the aircraft fuselage, the passageway 13 having an inlet 14 opening forwardly, and an outlet 15, seen more clearly in FIGS. 3 and 4, which opens generally downwardly. As may be seen more clearly in FIG. 2, the forward portion of the passageway 13 may suitably be defined by a cowling 19 extending along the underside of the aircraft fuselage. The propulsion system 10 may also be incorporated within respective wing mounted nacelles, for multi-engine aircraft applications, or in conjunction with tandem-mounted engines or fan propulsion units, not shown.

The forward portion of the passageway 13 is of generally conventional design, and the engine and duct are of a capacity for providing an exhaust flow sufficient, when directed downwardly, for supporting or maneuvering the aircraft. That is, the total net forces of the ejected exhaust flow are a large fraction of the weight of the aircraft, and exceed the weight of the aircraft if vertical operation is desired.

The aft portion 16 of the passageway 13 extends rearwardly and diagonally downwardly from the engine exhaust pipe to the outlet 15 and is referred to hereinbelow as the exhaust duct 16. As seen more clearly in FIGS. 3 and 4, the upper, aft surface of the exhaust duct 16, in longitudinal section, preferably defines a compound curve aft of the engine, extending initially horizontally immediately aft of the engine 12, and curving diagonally downwardly, thereby defining a first, concave curved wall surface portion 17A. The wall subsequently curves in an opposite direction to define a convex, second portion 17B, which extends to the aft end of the passageway outlet 15. The aft, convex surface portion 17B thus initially extends diagonally downwardly and rearwardly from the adjacent (and continuous), concave surface portion 17A, and then curves rearwardly such that its rearmost portion extends more nearly horizontally along the aircraft fuselage. The reason for the above described configuration will become apparent from the description below of the operation of the system.

Figures 6A, 6B, 6C:
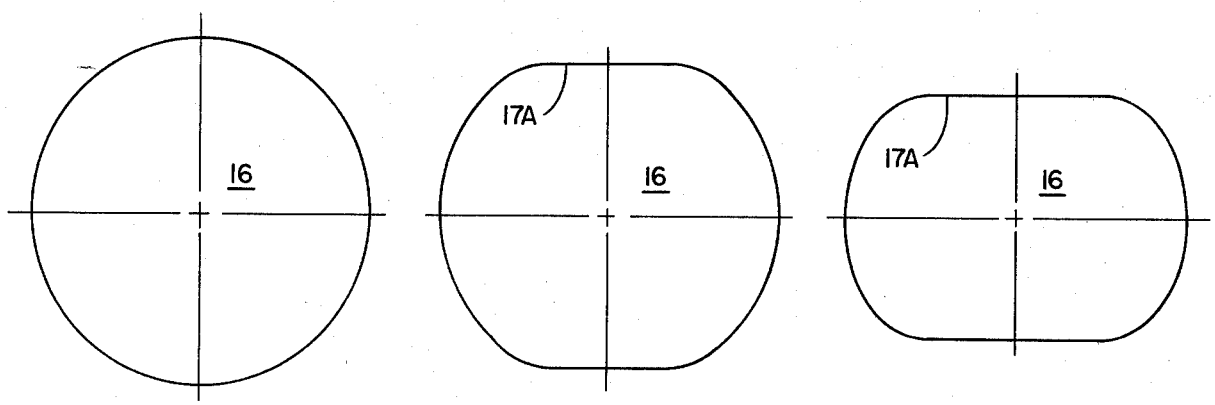
Figure 6D:
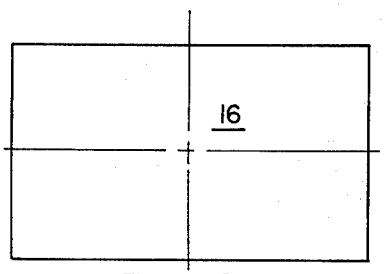
Figure 6E:
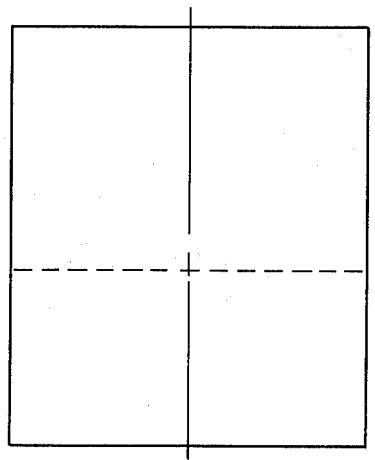
Figure 6F:
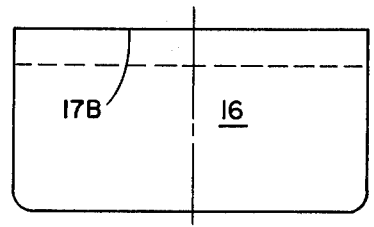

With added reference to FIGS. 5, and 6A through 6F, the exhaust duct 16 is gradually transferred from a circular to a rectangular cross-sectional configuration along its length extending rearwardly from the engine 12. With reference to FIG. 6A, the exhaust duct 16 is of a substantially circular cross-section adjacent the engine exhaust. The cross-sectional area of the exhaust duct 16 is gradually reduced along its length, for reasons which will be more fully discussed hereinbelow. With reference to FIGS. 6D and 5, the duct 16 becomes of substantially rectangular configuration at section 6D—6D, (which intersects the upper passageway wall approximately at the adjoining surface between the first concave surface portion 17A and the second, convex surface portion 17B). In the aft portion of the duct 16, substantially planar side walls 18A, and 18B (FIG. 6D) are defined by the rectangular duct structure. The rectangular cross section of the aft portion of the exhaust duct 16 corresponds to, and permits substantially sealing interaction with, an exhaust nozzle structure 20, now to be described.

Figure 3:
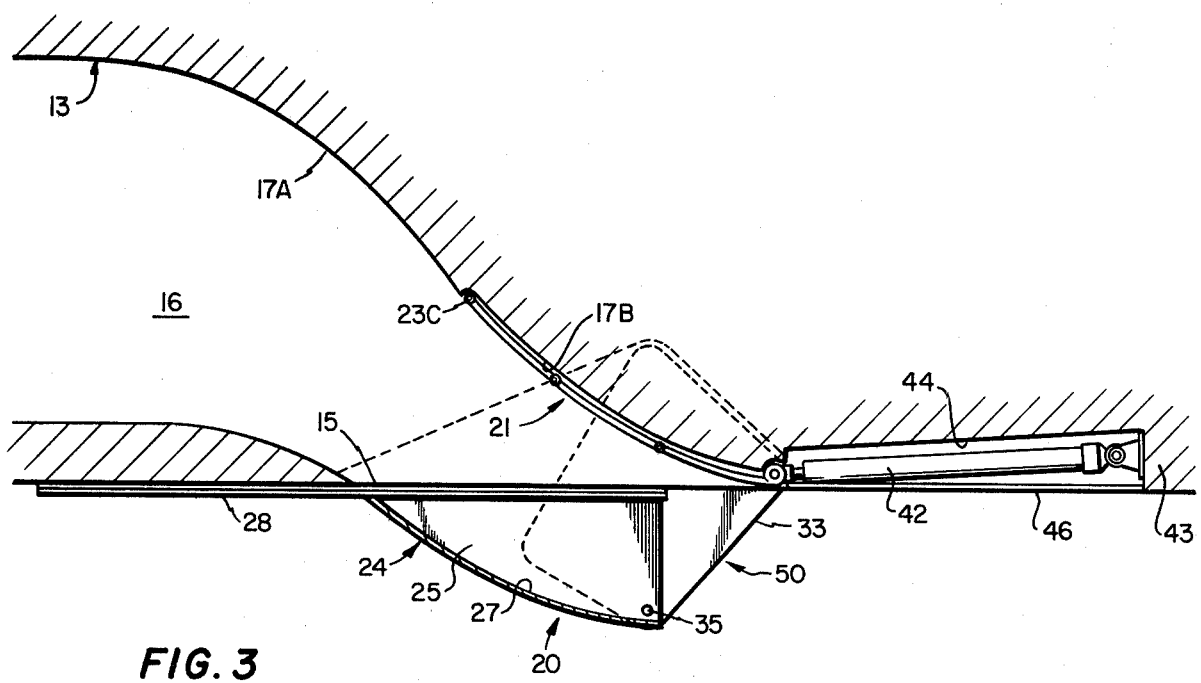
FIG. 3 is a longitudinal sectional view of the exhaust duct and exhaust nozzle structure of FIGS. 1 and 2, taken as on an enlarged scale, showing the exhaust duct structure positioned in its rearmost position.

With reference to FIGS. 3 and 4, a variable geometry exhaust deflection means, termed herein the exhaust deflection structure 21, extends within the aft portion of the exhaust duct 16 adjacent the outlet 15 and is connected to the aircraft structure defining the upper wall (17A, 17B) of the exhaust duct 16. In the preferred embodiment, the exhaust deflection structure 21 includes a plurality of panel segments 22A, 22B, and 22C, each of substantially rectangular configuration, which are pivotally interconnected at mutually contiguous sides by hinge structures 23A, 23B. The uppermost edge portion of the first (proximate) panel structure 22A is pivotally connected, by hinge structure 23C, to the structure defining the upper, aft wall of the exhaust duct 16, the hinge structure 23C extending transversely of the duct adjacent the transition between the contiguous, concave and convex surface portions 17A, 17B. The panel segments 22A, 22B, and 22C of the exhaust deflection structure 21 are of equal widths slightly less than the lateral spacing between the planar side walls 18A, 18B (FIG. 6D) of the exhaust duct 16 and are slideably and substantially sealingly associated with the planar side walls. Preferably, seal elements (not shown) are mounted on the outer edge surfaces of the panels 22A, 22B, and 22C for improving the sealing relationship between the panels and the side wall portions.

As seen most clearly in FIG. 3, the exhaust deflection structure 21 is preferably on an overall length substantially equal to that of the convex, upper duct wall portion 17B, whereby upon being positioned adjacent the surface 17B, the aft or distal end of the aft panel segment 22C is positioned adjacent the aft end of the duct outlet 15. In its preferred configuration, the exhaust deflection structure 21 is configured to seat against the upper convex surface 17B upon the deflection structure 21 being drawn rearwardly and upwardly to the upper position as seen in FIG. 4. Preferably, the individual panel segments 23A, 23B, 23C are each of a convex curvature (along their lengths extending between the hinge elements 23C, 23A, 23B, 43) corresponding to the adjacent convex curvature defined by the convex upper duct wall portion 17B, whereby the deflection structure 21 may seat uniformly against the convex wall portion 17B when in the upper, retracted position.

Figure 2:
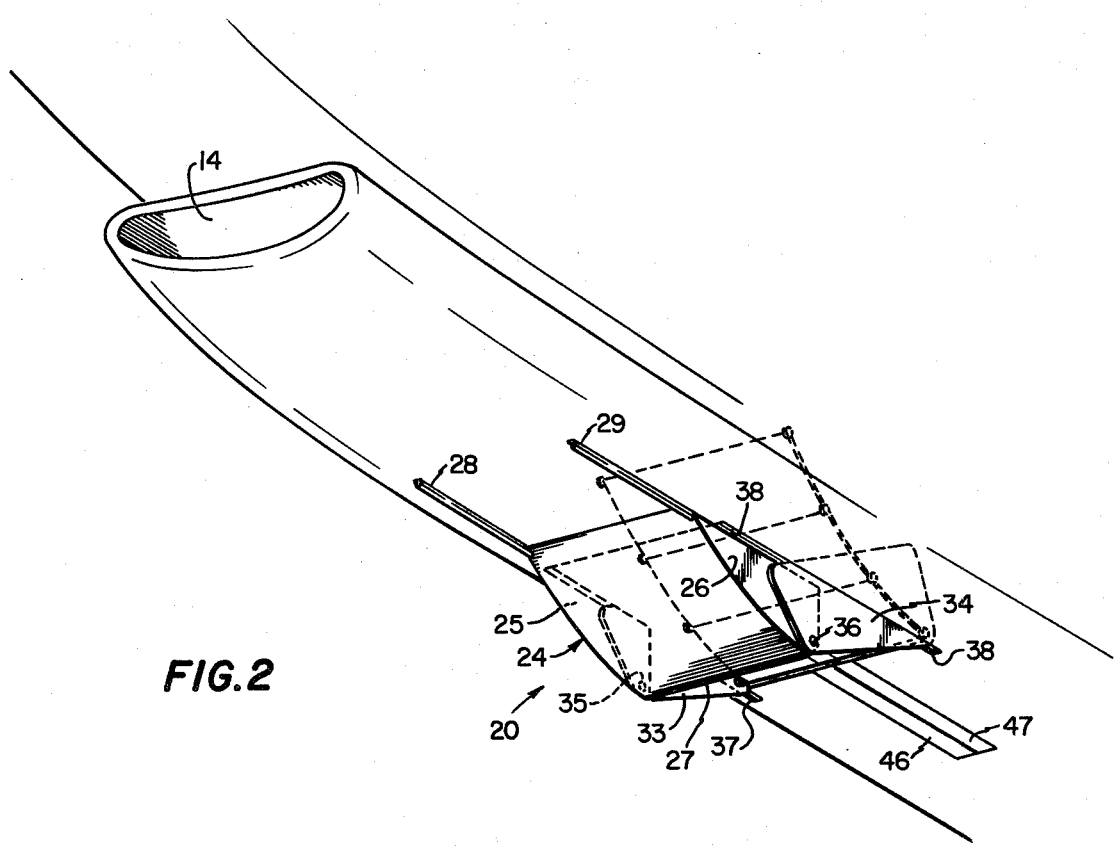
FIG. 2 is a perspective view of the exhaust deflection structure of the system of FIG. 1, also showing the lower portion of the fuselage of the aircraft.

In its preferred embodiment, the exhaust nozzle structure 20 further comprises a translatable guide structure or nozzle segment 24 which, as seen more clearly in FIG. 2, is linearly translatably mounted below the portion of the aircraft structure or fuselage through which extends the exhaust duct 16. The nozzle segment 24 is of a configuration similar to that of a scoop, having generally planar, mutually parallel, left and right side walls 25, 26 (FIG. 2) having linear upper edge portions extending along the underside of the aircraft fuselage and having curved, lower marginal portions continuous with a lower, transversely extending exhaust ramp 27 (FIGS. 3 and 4). The exhaust ramp portion 27 has a forward edge portion adjacent the aircraft fuselage and extends downwardly and rearwardly therefrom along a gradual curve, in the longitudinal direction, defining an outer convex surface.

As seen in FIG. 2, the nozzle segment 24 is movably supported below the aircraft fuselage upon left and right tracks 28, 29 mounted on the underside of the aircraft fuselage generally below the engine and exhaust duct portions. The tracks extend in mutually parallel alignment, along either side of the passageway outlet 15, and extend forward beyond the outlet. The tracks 28, 29 are spaced apart by a distance substantially equal to the distance between the left and right sidewalls 25, 26 of the nozzle segment 24. As shown in FIG. 7, the sidewalls (as represented by left sidewall 25) of the nozzle segment are suspended below the track structures, (e.g., track structure 28) suitably by means of bearings (or low friction sliders) 30. The bearings permit linear movement of the sidewalls 25, 26 along the track segments, for permitting translational movement of the nozzle segment 24 below the aircraft fuselage between a forward positional extreme, as seen in FIG. 4, and a rearward positional extreme, as seen in FIGS. 1, 2, and 3. In its forward position, the aft end of the nozzle segment 24 is approximately in vertical alignment with the forward edge of the exhaust duct outlet 15; in its rearmost position, the forward end of the nozzle segment 24 is in approximate alignment with the forward end of the exhaust duct outlet 15, and the exhaust ramp 27 extends rearwardly over most of the length of the exhaust outlet 15, as seen most clearly in FIG. 3.

In its preferred embodiment, the exhaust nozzle structure 20 further includes left and right, pivotal side plates 33, 34 preferably of approximately trapezoidal configuration with rounded corners, which are pivotally connected, as by pivotal fasteners 35, 36, at their lower, forward corner portions, to the lower aft corner portions of the side walls 25, 26 of the nozzle segment 24. As seen in FIG. 2, the pivotal side plates 33, 34 extend generally rearwardly, alongside and parallel to the left and right nozzle segment side walls 25, 26, and project vertically upwardly within left and right slots 37, 38 formed in the aircraft fuselage lower surface and extending alongside the tracks 28, 29, respectively. The pivotal side plates 33, 34 extend rearwardly alongside the panel segments 22A, 22B, 22C, and the aft panel segment 22C extends transversely between and is pivotally connected to the lower aft corners, respectively, of the left and right side walls 33, 34. A reinforcing rod 40 is suitably mounted to or connected along the aft edge portion of the aft segment 22C, extends transversely of the segment 22C, perpendicularly of the pivotal side plates 33, 34, and has its end portions rotatably mounted within suitable bearing structures 43 mounted adjacent the lower aft corners of the panels 33, 34.

The pivotal side plates 33, 34 thus serve to connect the movable nozzle segment 24 to the variable geometry exhaust deflection structure 21 (comprising segments 22A, 22B, 22C) for permitting simultaneous movement of the structures 21 and 24 while maintaining a constant spacing between them, i.e. between the aft, lower edge portion of the nozzle segment exhaust ramp 27 and the aft edge of the deflector panel segment 22C. Because of the pivotal interconnection of the panel segments 22A, 22B, 22C and because of the pivotal connection of the upper segment 22A to the upper wall 17A, 17B by hinge member 23C, forward translation of the nozzle segment 24 along the tracks 28, 29 from the aft position (FIG. 3) results in the panel segments being drawn forwardly and downwardly and therefore pivoted forwardly and outwardly, in a clockwise rotational direction as viewed in FIG. 4, about the hinge axis 23C. The segments 22B and 22C also pivot about axes 23A and 23B, as will be more fully discussed below in the discussion of the operation of the overall system.

Referring to FIG. 3, the exhaust ramp 27 of the nozzle segment 24 extends below and generally parallel to the convex wall surface portion 17B of the exhaust duct 16. The exhaust ramp 27, in longitudinal section, is of a gradual, concave curvature along its upper surface, which curvature corresponds approximately with the convex curvature of the aft duct surface portion 17B. Thus, the convex wall surface portion 17B and the concave upper surface of the exhaust ramp 27, together with the side walls 25, 26 (FIG. 6D) and side plates 33, 34, define together an extension of the exhaust duct 16 which follows generally the curvature of the aft, upper wall segment 17B and defines an aft exhaust opening 50 directioned rearwardly, approximately horizontally below the aircraft fuselage, when the nozzle segment 24 is in its aft position.

A suitable actuating and position monitoring system is provided for translating the nozzle segment 24, side plates 33, 34, and exhaust deflector structure 21. Referring to FIGS. 3 and 4, at least one, fluid powered, linear actuator 42 is pivotally mounted to a structural member 43 of the aircraft, aft of the exhaust duct outlet 15. The actuator 42 extends forwardly from the structural member 43 within a linear slot section 44 or other suitable housing formed in the lower portion of the aircraft structure in which the engine is mounted. The actuator rod 45 is pivotally and drivingly connected to the mid portion of the laterally extending, reinforcing rod 40 mounted in the aft edge portion of the aft panel segment 22C. When the actuator rod 45 is in its retracted position as seen in FIG. 3, the actuator 42 extends generally parallel to the fuselage within the slot 44 and the slot is closed by suitable, longitudinally extending, outwardly pivotal doors 46, 47 which are mutually contiguous, and contiguous with the adjacent, lower wall of the fuselage. When the actuator rod 45 is projected, as shown in FIG. 4, the doors 46, 47 are opened, as seen in FIG. 4A, by suitable actuating mechanisms.

The actuator mechanism 42 is associated with a corresponding position feedback transducer and servocontrol system, not shown, for controlling the position of the movable elements in response to command signals initiated by an operator or by computer control, for appropriately positioning the nozzle segment and exhaust deflector 21. The construction and operation of such servocontrol systems is known to those in the art and therefore will not be described in detail herein.

In operation, the exhaust deflection structure 21 and the nozzle segment 24 are positioned in the aft position (FIG. 3) during conventional, horizontal flight of the aircraft 11. As discussed above with reference to FIG. 3, the exhaust nozzle structure 20 (comprising the translatable nozzle segment 24, the pivotal side plates 33, 34 and the exhaust deflection structure 21) then define a rearward extension of the exhaust duct 16, having a gradual rearward and upward curvature, extending to the rearwardly directed, aft nozzle opening 50. Thus, exhaust gases from the engine 12 are conducted along the duct 16 between the movable elements 22A, 22B, 22C, the movable side plates 33, 34, and the nozzle segment 24 and are discharged rearwardly below the aircraft fuselage along an axis which extends generally horizontally, but which may have some downward slope, for providing forwardly directed propulsive forces. Because the panel segments 22A, 22B and 22C of the exhaust deflection structure 21 seat uniformly against the convex, aft duct surface 17B defined by adjacent fixed structure of the aircraft, the major forces produced by the engine exhaust against the panels 22A, 22B, 22C are transferred to the adjacent fixed aircraft structure, and thus, the movable elements of the exhaust nozzle structure 20 do not sustain substantial loads and stresses when the aircraft is operating in the conventional, horizontal flight mode. This minimizes fatigue stresses, since the conventional flight mode is normally employed during most flight regimes. Additionally, it will be seen that the exhaust passageway thus defined extends along a gradually curved path, and thereby provides an exhaust path offering little resistance to the exhaust flow. The system is therefore of high efficiency relative to prior-art systems employing multiple exhaust nozzles of relatively small diameters and having sharply curved connecting elements.

As suggested earlier, the exhaust duct is of a gradually converging configuration, whereby the exhaust flow velocity is somewhat increased along the length of the duct. As seen from FIGS. 6A–6F, the cross-sectional area at the aft exhaust nozzle opening 50 (FIG. 6F), preferably is approximately 50 to 60 percent of the area along section 6A—6A, FIGS. 5, 6A, adjacent the engine, in the present embodiment and as applied to a single engine aircraft having a cruising velocity in the transonic range. As will be understood by those in the art, the precise configuration of duct 16 and exhaust nozzle 50 will relate in practice to factors such as engine characteristics, aircraft cruising speed, and the like.

The exhaust gases may be directioned or "vectored" along more nearly downwardly extending axes, for increasing the lift component derived from the exhaust flow, by commanding the actuator 42 to exert a forwardly directed force upon the aft panel segment 22C and the pivotal side plates 33, 34. Such force is transmitted through the side plates 33, 34 to the nozzle segment 24, and serves to translate the nozzle segment forwardly along tracks 28, 29. Because the aft, lower corners of the pivotal side plates 33, 34 are pivotally connected to the panel segment 22C, forward movement of the nozzle segment 24 and side plates 33, 34 serves to swing the side plates 33, 34 downwardly, rotating them in a clockwise direction as viewed in the drawing, about the pivot points at fasteners 35, and simultaneously pivots the exhaust deflection structure 21 in a clockwise rotational direction about the pivot axis formed through hinge structure 23C. To effect the initial downward force, the actuator 42 is preferably positioned such that it extends along a somewhat downwardly extending axis relative to a plane substantially coincident with the aft deflection segment 22C. Alternatively, actuation forces can be provided by screwjacks mounted integrally in tracks 28 and 29, and connected to nozzle segment 24 in such way as to induce fore and aft movement of nozzle segment 24 and thence side plates 33 and 34 and exhaust deflection structure 21.

The exhaust flow and duct pressures impinging against the exhaust deflection structure 21 tends, of course, to urge the panel segments 22A, 22B, 22C rearwardly. Because the middle segment 22B is not connected to supporting structure, in the present embodiment, the middle segment 22B is urged and displaced rearwardly by the exhaust forces, and the three segments 22A, 22B, 22C then define a somewhat concave forward surface, as seen in FIG. 4. This concave surface cooperates with the adjacent concave duct surface 17A to provide a continuous, gently curving exhaust path exiting in a downward direction through the outlet 50, adjacent the forward edge of the exhaust opening 15. Thus, as in the first or aft position, the exhaust nozzle structure 20 again provides a continuous, aerodynamically efficient exhaust passageway, having a gently curved contour and providing a gradually converging flow path. In the aft position, for vertical thrust, this convergence is preferably somewhat less than that entailed for horizontal flight, to accommodate the greater exhaust flow required for vertical flight.

It will additionally be noted that the center of downward thrust through the aft exhaust nozzle 50 is displaced forwardly from its position with the nozzle structure 20 is in its aft position as seen in FIG. 3. This, the thrust forces directioned downwardly are brought forwardly along the aircraft fuselage, more nearly in alignment with the aft engine exhaust pipe, whereby the center of vertical thrust is brought more nearly in alignment with the center of mass of the aircraft. For employment in VSTOL operations, the propulsion system is augmented by reaction jets or other suitable devices, not shown, located elsewhere on the aircraft for control of pitch, roll and yaw attitudes. The construction and operation of such attitude control systems is also well known to those in the art and therefore will not be described in detail herein.

An advantageous feature of the present invention is its aerodynamic efficiency during the conventional flight mode. That is, because it does not entail multiple exhaust nozzles or other structures projecting from the aircraft fuselage, but instead incorporates a single nozzle segment 24 (which, as seen in FIG. 3, has a relatively small frontal surface area and is of aerodynamically efficient, wedge-shaped configuration) the structure adds minimal resistance to adjacent airflow. Moreover, the total turning angle for the engine exhaust gasses is substantially reduced from that of several of the prior-art systems.

While the invention has thus far been described with respect to the preferred embodiment, various modifications are also employed for other applications. For example, the variable geometry exhaust deflection structure may be constructed of more than three segments if a more gradual curvature is required or, alternatively, may be constructed of a single sheet of flexible material. In the latter embodiment, the variable geometry sheet (not shown) is positioned by one or more actuation devices for VSTOL operation and is advantageously configured to permit its seating against the aft convex surface 17B when in the conventional flight mode, as in the preferred embodiment. Preferably, the sheet of material is preformed to the contour desired for VSTOL operation and is compelled by reactive forces from actuator 42 to seat against the convex surface 17B when in the aft, conventional flight mode.

In the preferred embodiment, the interconnection of the transitional nozzle segment 24, the pivotal side plates 33, 34, and the exhaust deflection structure 21 provides structural rigidity and serves to form the vertically downwardly directed nozzle extension 50. For certain applications however, the nozzle segment 24 and side plates 33, 34 are omitted, and the variable geometry exhaust deflection structure is positioned by one or more servocontrol mechanisms for serving as a ramp or deflecting means without the accompanying side plates and nozzle segment 24. Alternatively, the side plates 33, 34, only may be omitted, and the nozzle structure 24 connected to the variable geometry exhaust deflection structure 21 by pivotal struts or cables, not shown, rather than by the pivotal plate structures 33, 34. The embodiment of FIGS. 1-7 is preferred, however, because as suggested above, the interconnected nozzle components (nozzle segment 24, side plates 33, 34, and panel segments 22B, 22C) cooperate to form a continuous aerodynamically efficient exhaust nozzle having high structural integrity.

It will thus be seen that the present invention provides an improved propulsion system for VSTOL aircraft which is of rugged construction, having relatively few moving components. It should be noted that a very straightforward, largely conventional actuation mechanism may be used, and that no complex linkage structure extending along the variable geometry exhaust deflection structure is required. The actuator, in the preferred embodiment is connected only to the aft deflection segment 22C; thus, the actuator bears rearward propulsive thrust loads directly (during the vertical flight mode), and is not required to transmit forces along a series of interconnected linkages connecting the respective segments 22A, 22B, 22C as in certain prior-art systems. Accordingly: (1) the structural and vibrational loads entailed in such multi-element linkage structures are not present; (2) the weight of the mechanism is thus reduced, and (3) fewer moving parts are entailed, thus minimizing cost and maintenance requirements.

As suggested above, the variable geometry structure 21 seats against the aft wall structure 17B, whereby it is reinforced by the aircraft structure during conventional horizontal flight. Vibrational and stress loads are thus substantially reduced during most of the operational regime. It will further be noted that the propulsion system is integrally constructed in cooperation with a conventional aircraft engine, entailing relatively few modifications of the engine and associated structure.

While only one embodiment of the invention, together with modifications thereof, has been described in detail herein and shown in the accompanying drawing, it will be evident that various further modifications are possible in the arrangement and construction of its components without departing from the scope of the invention as defined in the accompanying claims.

What is claimed is:

1. A VSTOL aircraft propulsion system comprising:
   aircraft structure defining a passageway having an inlet and an outlet, further comprising propulsive means mounted in the passageway for generating propulsive flow through the passageway, the passageway defining an exhaust duct communicating between the propulsive means and the passageway outlet and extending rearwardly from the engine means;
   exhaust deflection means extending within the exhaust duct, the exhaust deflection means having a portion which is pivotally movable relative to the aircraft structure;
   a translatable guide structure, and means, movably mounting the guide structure of the aircraft structure adjacent the passageway outlet, for permitting translation of the guide structure between a forward positional extreme, and an aft positional extreme in which the guide structure is in alignment with at least a portion of the passageway outlet;
   linkage means, interconnecting the guide structure and the exhaust deflection means, for translating pivotal movement of the exhaust deflection means into translational movement of the guide structure, the guide structure and exhaust deflection means comprising means defining a directionable exhaust nozzle communicating with the exhaust duct, and
   means for positioning the guide structure and the movable portion of the exhaust deflection means, for directioning the exhaust nozzle formed between the guide structure and the movable portion of the exhaust deflection means.

2. The apparatus of claim 1, wherein the means movably mounting the guide structure on the aircraft structure comprises track means mounted on the aircraft structure for permitting translation of the guide structure adjacent the aircraft structure.

3. The apparatus of claim 1, the means movably mounting the guide structure comprising means mounting the guide structure to a lower portion of the aircraft structure, the exhaust duct having an aft portion adjacent the outlet, the guide structure having an aft portion which extends at least partially below the aft portion of the exhaust duct when the guide structure is in its aft positional extreme.

4. The apparatus of claim 3, wherein the exhaust duct is partially defined by an aft, upper wall portion which extends downwardly and rearwardly along a convex curvature.

5. The apparatus of claim 4, wherein the guide structure has an upwardly facing surface of concave curvature corresponding in its configuration to a convex portion of the aft, upper wall portion of the exhaust duct, the guide structure comprising means cooperating with the duct wall convex portion and the deflection structure to define a continuation of the exhaust duct through the passageway outlet.

6. The apparatus of claim 4, wherein the movable portion of the exhaust deflection means comprises means adapted to conform to and seat against the aft, upper wall portion of the exhaust duct.

7. The apparatus of claim 3, wherein the means interconnecting the guide structure and the exhaust deflection means comprises first and second plates which are pivotally mounted to and alongside respective opposite side portions of the guide structure and which are pivotally connected to the movable portion of the exhaust deflection means.

8. The apparatus of claim 7, wherein the first and second plates comprise means which cooperate with the guide structure, and wherein the exhaust nozzle communicating with the exhaust duct is partially defined by the first and second plates.

9. The apparatus of claim 8, wherein the exhaust duct has a forward portion of curved cross-sectional configuration and an aft portion of substantially rectangular configuration, the exhaust deflection structure comprising means extending within the aft duct portion.

10. The apparatus of claim 1, wherein the aircraft structure comprises an aircraft fuselage.

11. The apparatus of claim 1, wherein the aircraft structure comprises an engine nacelle.

12. A VSTOL aircraft propulsion system comprising: aircraft structure defining a passageway having an inlet and an outlet, further comprising means for generating propulsive flow through the passageway, the passageway having an exhaust duct portion extending downstream of the means for generating propulsive flow and communicating with the passageway outlet, the exhaust duct portion having an upper wall extending rearwardly, downstream of the means for generating propulsive flow through the passageway, the passageway having an exhaust duct portion extending downstream of the means for generating propulsive flow and communicating with the passageway outlet, the exhaust duct portion having an upper wall extending downstream of the means for generating propulsive flow;

an exhaust nozzle structure mounted on the aircraft structure adjacent the passageway outlet and comprising means for directioning exhaust flow along selected flow paths, the nozzle structure having an elongated, variable geometry deflection structure adjacent the upper wall, the variable geometry deflection structure having a proximate end portion connected to the aircraft structure within the exhaust duct and a distal end portion spaced downstream of the proximate end portion, the variable geometry deflection structure comprising means translatable between a first positional extreme in which it extends alongside the upper wall of the exhaust duct and a second positional extreme in which its distal end portion is translated forwardly and downwardly from the upper wall, the variable geometry deflection structure further comprising means defining, in its first positional extreme, a first configuration in conformity with the configuration of the adjacent exhaust duct upper wall and defining, in its second positional extreme, a second configuration defining a forwardly concave surface means for directioning propulsive flow through the passageway outlet and effecting vertical thrust to the aircraft structure, the duct upper wall comprising means supporting and preventing deformation of the variable geometry deflection structure in its first positional extreme.

13. The apparatus of claim 12, wherein the first configuration of the variable geometry structure comprises a convex configuration, and whereby the exhaust duct upper wall portion, adjacent the variable geometry deflection structure, defines a convex surface means for supporting the variable geometry deflection structure in a convex configuration when the deflection structure is in its first positional extreme.

14. The apparatus of claim 12, the duct upper wall including a concave portion extending forwardly of the variable geometry deflection structure and aft of the means for generating propulsive flow, the variable geometry deflection structure, in its second positional extreme, extending contiguously from the concave wall portion and defining therewith a concave surface means for conducting exhaust flow along a rearwardly and downwardly curved path beginning within the aircraft structure and terminating adjacent the passageway outlet.

15. The apparatus of claim 13, the aircraft structure having a bottom wall, the passageway outlet opening through the bottom wall, the variable geometry deflection structure comprising means for directioning exhaust flow along a continuous, rearward and downward path through the passageway outlet adjacent the center of mass of the aircraft structure.

16. The apparatus of claim 12, wherein the deflection structure comprise a plurality of contiguous panel segments which are mutually interconnected by hinge means, the deflection structure having an upper panel segment pivotally connected to the upper duct wall, the upper duct wall comprising a wall structure fixedly mounted within the exhaust duct.

17. The apparatus of claim 16, comprising an actuator means connected between the aircraft structure and the distal end portion of the deflection structure for pivoting the deflection structure outwardly from the aft wall portion to its second positional extreme, the deflection structure and actuator means comprising means defining a concave ramp structure for directioning exhaust flow from the engine along a path extending substantially downwardly from the aircraft, for providing upwardly directioned thrust forces.

18. The apparatus of claim 17, wherein the actuator means is connected between the distal end portion of the variable geometry deflection structure and a portion of the aircraft structure spaced rearwardly from the deflection structure, and comprises means for applying a force urging the deflection structure downwardly and forwardly for translating the deflection structure to its concave configuration and its second positional extreme.

19. The apparatus of claim 18, wherein the duct upper wall includes a convex wall portion adjacent the deflection means, the deflection means comprising means defining a convex configuration upon the deflection means being translated to its first positional extreme and upon the guide structure being translated to its aft position.

20. The apparatus of claim 12, further comprising a nozzle segment and means movably connecting the nozzle segment to the aircraft structure below the exhaust duct and for permitting translation of the nozzle adjacent the passageway outlet, and means connecting the nozzle structure to the variable geometry deflection structure for simultaneous movement of the deflection structure and the nozzle structure.

21. The apparatus of claim 20, wherein the nozzle segment comprises means movable between a forward position, and an aft position in which it extends rearwardly over at least a portion of the passageway outlet.

22. The apparatus of claim 21, the means connecting the nozzle segment to the deflection structure comprising linkage means connecting the nozzle segment to the distal end portion of the deflection structure.

23. The apparatus of claim 22, wherein the means interconnecting the nozzle structure and the deflection structure comprises first and second plate structures extending vertically alongside the nozzle structure, each plate structure having one end portion pivotally connected to the nozzle structure and another end portion spaced rearwardly from the nozzle structure and pivotally connected to the deflection structure, the plate structures comprising means translating pivotal movement of the deflection structure into linear movement of the nozzle structure.

24. A VSTOL aircraft propulsion system comprising:
aircraft structure defining a passageway having an inlet and an outlet, further comprising propulsive means mounted in the passageway for generating propulsive flow through the passageway, the passageway defining an exhaust duct communicating between the propulsive means and the passageway outlet, the exhaust duct having an upper wall extending rearwardly from the propulsive means;
variable geometry exhaust deflection means extending within the exhaust duct and having a proximate end portion connected to the aircraft structure adjacent the duct upper wall;
a translatable guide structure and means, movably mounting the guide structure on the aircraft structure adjacent the passageway outlet, for permitting translation of the guide structure between a forward positional extreme, and an aft positional extreme in which the guide structure is in alignment with at least a portion of the passageway outlet;
the exhaust deflection means comprising means movable, in concert with the guide structure, between a first positional extreme in which it extends alongside the exhaust duct upper wall and a second positional extreme in which its distal end portion is translated forwardly and downwardly from the upper wall, the exhaust deflection means comprising means defining, in its first positional extreme, a first configuration conforming to the configuration of the adjacent exhaust duct upper wall and defining, in its second positional extreme and upon the guide structure being moved to its forward position, a forwardly concave surface means for directioning propulsive flow downwardly between the deflection means and the guide structure.

25. The apparatus of claim 24, the deflection means comprising means, cooperating with the duct upper wall, for providing a continuous deflection ramp surface extending along the duct upper wall and continuing along the variable geometry deflection means, for conducting propulsive airflow along the upper duct wall, the deflection means and the duct outlet.

* * * * *